United States Patent Office 3,521,376
Patented July 21, 1970

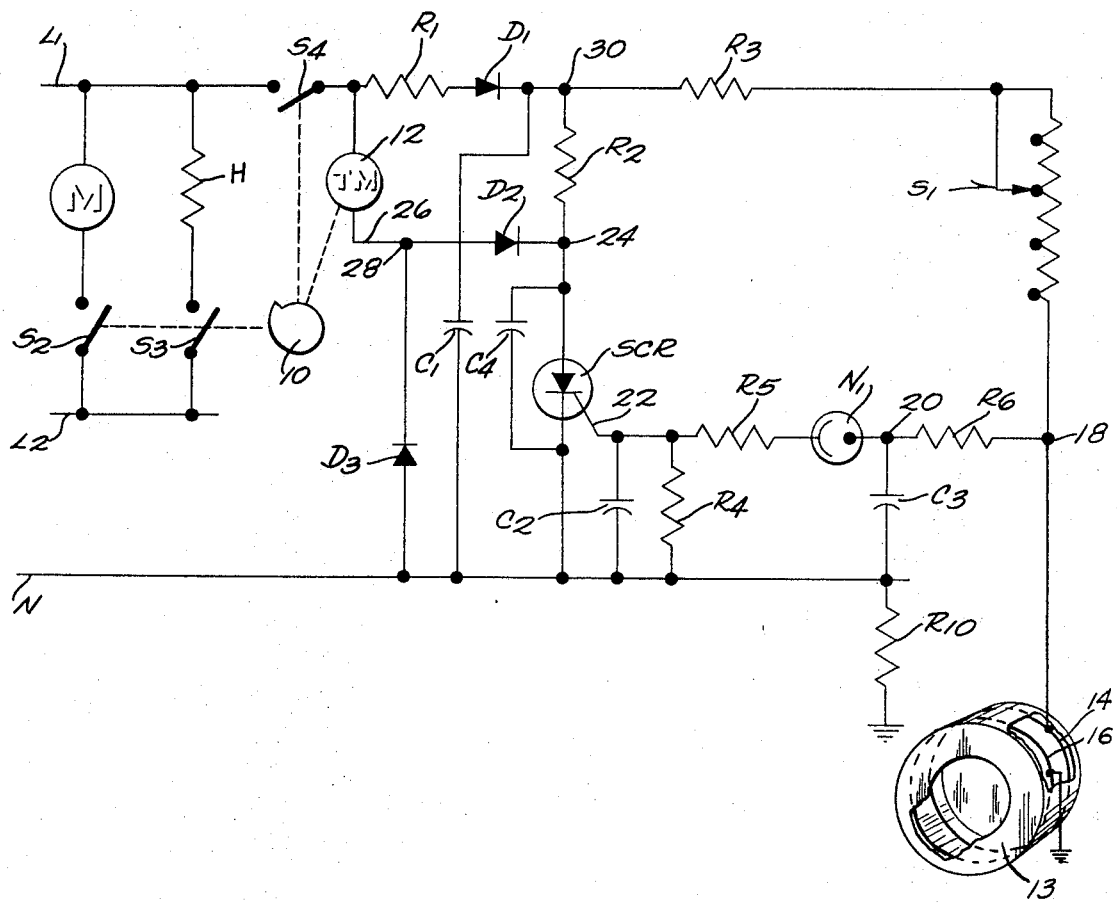

3,521,376
MOISTURE SENSING CIRCUIT FOR ACTUATING A DRYER TIMER MOTOR
Wilbert E. Beller, Park Ridge, Ill., assignor to Controls Company of America, Melrose Park, Ill., a corporation of Delaware
Filed Sept. 22, 1967, Ser. No. 669,890
Int. Cl. F26b 25/22; H02p 1/04
U.S. Cl. 34—45                                   7 Claims

ABSTRACT OF THE DISCLOSURE

A moisture sensing control circuit provides a DC supply to one of two sensing rings in a dryer drum, the other of which is grounded. The charge so supplied leaks off to ground at a rate dependent upon the moisture content of the clothes within the drum. When the charge on the neon bulb reaches the firing point of the neon bulb the bulb becomes conductive to turn on the silicon controlled rectifier which now permits the diode $D_2$ to pass the positive half of the AC supply. The negative half of the AC supply can be passed by diode $D_3$ at all times. By controlling one-half of the AC supply to the timer motor the operation of the motor is controlled. This concept is applicable to control of any electrically operated device requiring AC for operation.

BACKGROUND OF INVENTION

Electronic moisture sensing controls for dryers have been known for the last few years and essentially all of such controls which have met with any commercial success provide a DC charge to a sening ring in the dryer drum. This charge is drained off through the clothes at a rate dependent on the moisture level of the clothes but gradually the charge builds up as the clothes dry. This charge is applied to a neon bulb which is normally non-conductive but when the charge reaches sufficient magnitude (indicative of the desired moisture level or dryness) the neon bulb becomes conductive and passes a pulse of energy which may, for example, turn on a silicon controlled rectifier. When it was desired to control any heavy duty switching with a silicon controlled rectifier it was necessary to use pilot relays or the like to, in turn, energize a timer or solenoid to do the heavy duty switching. The principal purpose of this invention is to eliminate such pilot relays and the like and to directly and more cheaply control a timer motor which can then be energized to accomplish the switching as desired.

SUMMARY OF THE INVENTION

A timer motor is connected across an AC supply with the supply being controlled by two rectifiers, one of which permits passage of the negative half of the AC supply while the other would pass the positive half of the AC supply but for the fact that there normally is no way to render the latter diode conductive. The latter diode is rendered conductive, however, when the sensing circuit renders a silicon controlled rectifier conductive. This, then, means the silicon controlled rectifier is controlling one-half of the AC supply to the timer motor and by this very simple expedient the operation of the timer motor is controlled without expensive relays and the like.

DESCRIPTION OF DRAWING

The single figure of the drawings is a schematic wiring diagram of the control in conjunction with the essential features of an electric dryer.

DESCRIPTION OF PREFERRED EMBODIMENT

The dryer motor M is connected across the lines $L_1$, $L_2$ under control of switch $S_2$ while the heater H for the dryer is also connected across lines $L_1$ and $L_2$ under control of switch $S_3$. The remainder of the circuit is connected across lines $L_1$ and N under control of switch $S_4$. Switches $S_2$, $S_3$, and $S_4$ are controlled by cams 10 which are rotated by the timer motor 12. The timer, which includes the timer motor 12 and cam 10, is under control of a manual knob which is rotated to an initial position closing switches $S_2$, $S_3$, and $S_4$ to supply electricity to the dryer drum motor to rotate the dryer drum 13 to also energize the dryer heater and to provide current to the sensing circuit. The current supply to sensing ring 14 is provided through resistance $R_1$, diode $D_1$, thence to resistance $R_3$ and the rotary switch $S_1$ (operative to select the various available resistors) to provide current to junction 18 and, hence, to contact ring 14 inside the dryer drum. The current so supplied at junction 18 will leak off to the grounded ring 16 at a rate dependent upon the moisture content of the clothes. The charge at 18 will be reflected at junction 20 through dropping resistor $R_6$ to apply a potential across neon bulb $N_1$. Junction 20 is connected to ground through capacitance $C_3$ and resistance $R_{10}$. When the charge on capacitance $C_3$ builds up to the firing voltage of $N_1$ as a result of dry clothes limiting leakage to ground from ring 14 the neon bulb becomes condutive to supply a pulse of energy through resistance $R_5$ and to gate 22 of the silicon controlled rectifier SCR. This will render the SCR conductive.

Going back now to the timer motor 12, it will be noted that one side of the motor is connected to lead $L_1$ and the other side of the motor is connected to diode $D_2$ leading to junction 24. The lead 26 from the motor is also connected at junction 28 to line N through diode $D_3$ which is set to block the positive of the AC supply but to pass the negative of the AC supply. Diode $D_2$ is connected so as to pass the positive of the AC supply but since junction 24 on the output side of $D_2$ is not normally connected to permit conduction the motor 12 is supplied only with the negative of the AC supply through diode $D_3$. When, however, the SCR or directional electronic switching device is rendered conductive by the neon bulb (which is a gaseous switching device or triggering device) a conductive path is available for the positive of the AC supply through diode $D_2$ and the SCR to lead N. Therefore, the timer motor now sees a complete AC supply and starts operating. While a timer motor is used here, the concept is applicable to any electrically operated device requiring AC. In the foregoing it will be understood all the diodes are unidirectional devices passing current in one direction only.

It will be noted that junction 24 is connected to the line between $D_1$ and $R_3$ through resistance $R_2$ to junction 30. $R_1$, for example, may be 1,000 ohms while $R_2$ may be 22 K ohms. Therefore, under normal conditions the voltage at junction 30 is higher than at 24 so $D_2$ cannot pass the positive of the AC supply. It will be noted that the output side of diode $D_1$ is connected to line N through capacitor $C_1$. This capacitor is charged at a potential equivalent to the potential at junction 30. Normally the SCR would tend to extinguish as the positive of the AC supply fell off through $D_2$ as the AC supply fell to zero. Capacitance $C_1$, however, can now discharge through resistance $R_2$ to keep the SCR conductive until the next positive going signal comes through $D_2$ at which time, of course, $D_1$ is passing current to recharge capacitance $C_1$. In this way the SCR is kept conductive even though the neon may have extinguished. The only further details of the circuit to be described are capacitors $C_2$ and $C_4$. $C_4$ is connected in parallel around SCR while $C_2$ is connected between the gate of the SCR and line N. These capacitors function to smooth any random electric impulses which may possibly appear in the circuit and prevent rendering the SCR conductive on a random, false signal.

I claim:
1. A control comprising,
an electrically operated device requiring alternating current for operation,
an alternating current supply circuit for the device,
means for controlling only one-half of the alternating current wave form to prevent operation of the device and responsive to a control condition to pass alternating current to the device to render the device operative,
said means including,
- a directional electronic switching element in the circuit and normally non-conducting and having means for triggering into the conductive state,
- a unidirectional element in circuit with the device to pass current of one polarity to the device,
- said switching element being operative to pass current of the opposite polarity when conductive,
- a second unidirectional element in the circuit operative to pass current of said opposite polarity to said switching element.

2. A control according to claim 1 including
circuit means for supplying current of said opposite polarity to said switching element during the portion of the alternating current cycle that the supply is of reversed polarity.

3. A control according to claim 2 in combination with a dryer including a heater, a rotating drum, and a moisture sensing control of the type impressing a direct current charge on a sensing element in the drum for leakage to ground at a rate dependent upon the moisture content of the drum contents whereby the charge remaining on the sensing element is impressed on a capacitor until of sufficient magnitude to render conductive a gaseous switching device,
the discharge of said capacitor through the gaseous switching device being applied to the triggering means of the directional electronic switching element, said electrically operated device thereupon being rendered operative and being provided with means for terminating operation of the dryer and control.

4. The combination of claim 3 in which the alternating current supply is rectified to provide a source of direct current to the sensing control and the circuit means (named in claim 2) comprises a capacitor positioned between ground and said source of direct current, said second unidirectional element is positioned between said electrically operated device and the directional electronic switching element.

5. The combination of claim 4 including a timer the motor of which is said electrically operated device,
said unidirectional devices being rectifiers the first of which blocks positive current through the motor while allowing negative current flow and the second of which passes positive current through the motor while blocking reversed flow.

6. The combination of claim 5 in which the directional switching device is a silicon controlled rectifier the trigger of which is connected to the gaseous switching device and the anode of which is connected to the direct current supply to the moisture sensing control and to said second rectifier, said capacitor (specified in claim 4) being charged positively while the rectified direct current supply for the moisture sensing control goes positive and being discharged through the SCR to keep the anode of the SCR positive and the SCR conductive after it has been triggered.

7. A control according to claim 6 in which the rectified direct current supplied to said capacitor is at less potential than applied to the anode through said second rectifier and separated therefrom by a resistor.

References Cited

UNITED STATES PATENTS

| | | | |
|---|---|---|---|
| 3,402,478 | 9/1968 | Hetrick | 34—53 |
| 3,248,799 | 5/1966 | Worst | 34—53 |
| 3,248,800 | 5/1966 | Pierce | 34—53 |

MARK NEWMAN, Primary Examiner

A. D. HERRMANN, Assistant Examiner

U.S. Cl. X.R.

34—53; 318—483